United States Patent Office 3,125,272
Patented Mar. 17, 1964

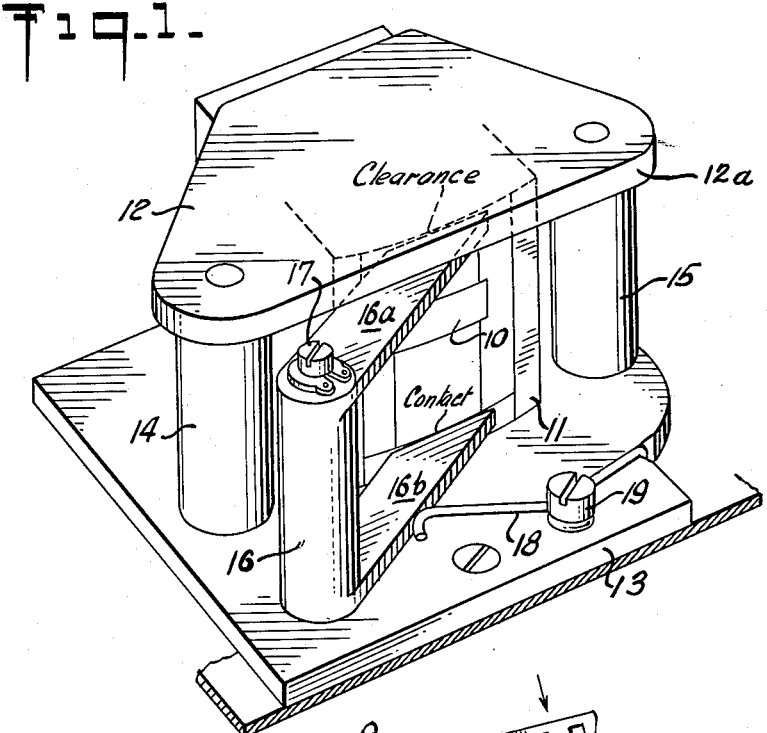
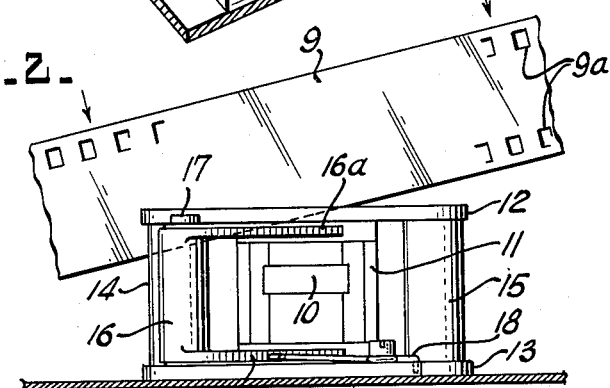
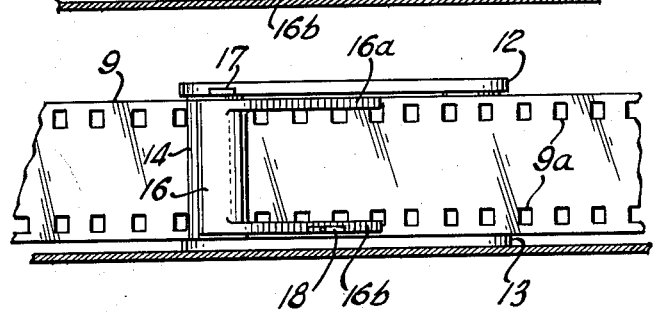

3,125,272
FLEXIBLE STRIP GUIDE
Raymond G. Hennessey, Huntington, and Kenneth Li Donnici, Brooklyn, N.Y., assignors to Fairchild Camera and Instrument Corporation, a corporation of Delaware
Filed Mar. 12, 1962, Ser. No. 178,968
7 Claims. (Cl. 226—196)

This invention relates to flexible strip guides and, while it is of general application, it is particularly suitable for use as a guide of motion picture film moving past a sound head in a motion picture camera or projector and will be specifically described in such an embodiment.

It is well known that in the transport of flexible strips such as motion picture film, magnetic or punched paper or plastic tapes, and the like, it is necessary to provide guides for the moving strip which ensure their accurate location with respect to sound or picture transducers and, at the same time, avoid scratching or abrading the strip during repeated passages through the guide. An important feature of all such guides is the facility with which a flexible strip may be threaded into the guide upon the insertion of a new strip in the apparatus.

Numerous guides for the purposes described have heretofore been proposed and marketed but they have left much to be desired with regard to the facility of insertion of the strip in the guide and its subsequent removal. For example, conventional guides in use generally require separate unlocking and locking actions upon insertion of the strip in the guide and upon its subsequent removal. This is a particular disadvantage in apparatus designed for use by amateurs or other unskilled operators.

It is an object of the invention, therefore, to provide a new and improved flexible strip guide which obviates one or more of the above-mentioned disadvantages of prior devices of this type.

It is another object of the invention to provide a new and improved flexible strip guide in which the guide is automatically unlocked and subsequently locked by the mere insertion of the strip itself in the guide.

In accordance with the invention, a self-locking guide for a movable flexible strip comprises a support for the strip, guide members disposed on either side of the support for restraining the strip from lateral motion, a pivoted pressure shoe having at least one arm normally extending within, but movable to a position clearing, one of the guide members and normally registering with an edge of the strip, and means for biasing the pressure shoe into engagement with the strip, whereby edgewise insertion of the strip between the pressure shoe arm and the guide member cams the arm clear of the guide member for insertion of the strip between the guide members.

For a better understanding of the present invention, together with other and further objects thereof, reference is had to the following description taken in connection with the accompanying drawing, while its scope will be pointed out in the appended claims.

Referring now to the drawing:

FIG. 1 is a perspective view of a flexible strip guide embodying the invention incorporated in a sound transducer for motion picture film;

FIG. 2 is a front view of the guide of FIG. 1 showing the method of inserting the film in the guide; while FIG. 3 is a front view of the guide of FIG. 1 with the film in place.

Referring now to FIG. 1 of the drawing, there is illustrated a self-locking guide for a movable flexible film strip comprising a stationary support for the strip illustrated as a sound pickup head 10 mounted in a suitable frame 11, this head and frame forming no part of the present invention. The support 10, 11 has a pair of guide members 12 and 13 extending from either side thereof for restraining the strip or film from lateral motion with respect to the support 10, 11. If the support for the movable strip is stationary, as illustrated, the guide members may be unitary therewith. However, if the support is a portion of a movable film transport, such as a sprocket wheel or idler roller, the guide members will be separate from, but disposed closely adjacent, the strip support. The guide members or plates 12, 13 may be secured in desired relative positions by any suitable means such as posts 14, 15. The guide member 12 extends beyond the face of the support 10, 11 for only a short distance and has an edge surface 12a approximately parallel to such surface.

The strip guide of the invention further comprises a pressure shoe 16 pivotally mounted on the guide member 13, as by a pin 17, and having at least one arm, and preferably a pair of arms 16a and 16b, normally extending within the guide members 12 and 13, respectively, and closely adjacent thereto but pivotally movable about the pin 17 to a position in which the arm 16a clears the edge 12a of the guide member 12. As shown, the arms 16a, 16b normally form an acute angle with the edge surface 12a of the guide member 12. As shown more clearly in FIG. 3, when a film strip 9 has been inserted in the guide, the arms 16a, 16b normally register with the edges of the film strip 9 outside of the sprocket holes 9a. One of the arms, for example the arm 16a, is sufficiently shorter than the other arm 16b that when the latter engages the strip 9 within the guide, the arm 16a provides a clearance between its end surface and the engaged film.

The strip guide of the invention further comprises resilient means for biasing the pressure shoe 16 into engagement with a film strip 9 disposed in the guide. In the event that the strip guide is embodied in stationary apparatus which is always maintained in a given attitude, the weight of the arms 16a, 16b, either alone or with supplemental weighting, may provide an adequate bias. However, when the strip guide is embodied in portable apparatus, there is preferably provided a biasing spring 18 mounted on a post 19 secured to the guide member 13 and engaging the arm 16b to bias the shoe 16 for pivotal movement into engagement with the film strip 9 when positioned in the guide.

It is believed that the operation of the self-locking guide embodying the invention will be apparent from the foregoing description. In brief, referring to FIG. 2, if the film strip 9 is inserted edgewise between the arm 16a and the edge surface 12a of its adjacent guide member 12, it effectively cams the arm 16a against the light restraint of the biasing spring 18 until the arm 16a clears the surface 12a, permitting the film to be moved transversely of the guide until it lies between the guide members 12 and 13, whereupon the pressure shoe 16 effectively moves the film strip 9 down into engagement with the supporting surface of the member 10, 11. Since the arms 16a, 16b register with the film strip 9 only outside of the sprocket holes, as shown in FIG. 3, the shoe does not engage any of the areas of the film strip including sound or picture information so that there is no abrasion of such areas. Furthermore, it is seen that the film strip 9, upon edgewise insertion, itself unlocks the pressure shoe and, when inserted between the guide members 12 and 13, automatically releases the pressure shoe as it falls into position on the surface of the supporting member 10, 11. By making the arm 16a slightly shorter than the arm 16b, for example a few hundredths of an inch, a clearance is provided between this arm and film strip. This avoids the problem of attempting to secure substantially equal pressures on the opposite edges of the film by the arms 16a and 16b, which would be highly desirable if both arms engaged the film strip, in order to make sure that the frictional drags on both edges of the film are equal, avoiding any tendency to twist or distort the film strip as it passes through the guide. However, if the strip guide is to be used in association with a film gate, the arms should be of the same length to engage both edges of the film and maintain close contact between the film and the gate aperture.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A self-locking guide for a movable flexible strip comprising:
   (a) a support for the strip;
   (b) guide members disposed on either side of said support for restraining the strip from lateral motion;
   (c) a pivoted pressure shoe having at least one arm normally extending within, but movable to a position clearing, one of said guide members and normally registering with an edge of the strip;
   (d) and means for biasing said shoe into engagement with the strip, whereby edgewise insertion of the strip between said arm and said guide member cams said arm clear of said guide member for insertion of the strip between said guide members.

2. A self-locking guide for a movable flexible strip comprising:
   (a) a stationary support for the strip having a pair of guide members extending from either side thereof for restraining the strip from lateral motion;
   (b) a pivoted pressure shoe having at least one arm normally extending within, but movable to a position clearing, one of said guide members and normally registering with an edge of the strip;
   (c) and means for biasing said shoe into engagement with the strip, whereby edgewise insertion of the strip between said arm and said guide member cams said arm clear of said guide member for insertion of the strip between said guide members.

3. A self-locking guide for a movable flexible strip comprising:
   (a) a support for the strip;
   (b) guide members disposed on either side of said support for restraining the strip from lateral motion;
   (c) one of said guide members extending a short distance beyond the face of said support and having an edge surface approximately parallel thereto;
   (d) a pivoted pressure shoe having at least one arm normally extending within, but movable to a position clearing, said one of said guide members and normally registering with an edge of the strip;
   (e) and means for biasing said shoe into engagement with the strip, whereby edgewise insertion of the strip between said arm and said edge surface of said guide member cams said arm clear of said guide member for insertion of the strip between said guide members.

4. A self-locking guide for a movable flexible strip comprising:
   (a) a support for the strip;
   (b) guide members disposed on either side of said support for restraining the strip from lateral motion;
   (c) one of said guide members extending a short distance beyond the face of said support and having an edge surface approximately parallel thereto;
   (d) a pivoted pressure shoe having at least one arm normally extending within, but movable to a position clearing, said one of said guide members, normally forming an acute angle with said edge surface, and normally registering with an edge of the strip;
   (e) and means for biasing said shoe into engagement with the strip, whereby edgewise insertion of the strip between said arm and said edge surface of said guide member cams said arm clear of said guide member for insertion of the strip between said guide members.

5. A self-locking guide for a movable flexible strip comprising:
   (a) a support for the strip;
   (b) guide members disposed on either side of said support for restraining the strip from lateral motion;
   (c) a pivoted pressure shoe having a pair of arms normally extending within said guide members but movable to a position clearing one of said guide members and normally registering with the edges of the strip;
   (d) and means for biasing said shoe into engagement with the strip, whereby edgewise insertion of the strip between one of said arms and its adjacent guide member cams said arm clear of said guide member for insertion of the strip between said guide members.

6. A self-locking guide for a movable flexible strip comprising:
   (a) a support for the strip;
   (b) guide members disposed on either side of said support for restraining the strip from lateral motion;
   (c) a pivoted pressure shoe having at least one arm normally extending within, but movable to a position clearing, one of said guide members and normally registering with an edge of the strip;
   (d) and a biasing spring connected to bias said shoe for pivotal movement into engagement with the strip, whereby edgewise insertion of the strip between said arm and said guide member cams said arm clear of said guide member for insertion of the strip between said guide members.

7. A self-locking guide for a movable flexible strip comprising:
   (a) a support for the strip;
   (b) guide members disposed on either side of said support for restraining the strip from lateral motion;
   (c) a pivoted pressure shoe having a pair of arms normally extending within, but movable to a position clearing, one of said guide members and normally registering with the edges of the strip;
   (d) one of said arms being sufficiently shorter than the other that when said other arm engages the strip said one arm provides a clearance therebetween;
   (e) and means for biasing said shoe into engagement with the strip, whereby edgewise insertion of the strip between one of said arms and its adjacent guide member cams said arm clear of said guide member for insertion of the strip between said guide members.

References Cited in the file of this patent

UNITED STATES PATENTS

| | | |
|---|---|---|
| 1,506,437 | Midgley | Aug. 26, 1924 |
| 1,991,870 | Schulz | Feb. 19, 1935 |
| 1,997,409 | May | Apr. 9, 1935 |
| 2,073,224 | Ross | Mar. 9, 1937 |
| 2,228,092 | Sperry | Jan. 7, 1941 |
| 2,549,271 | Wienke | Apr. 17, 1951 |
| 2,710,188 | Manley | June 7, 1955 |